US010752333B2

(12) United States Patent
Brunken, Jr. et al.

(10) Patent No.: US 10,752,333 B2
(45) Date of Patent: *Aug. 25, 2020

(54) WING-FUSELAGE INTEGRATED AIRFRAME BEAMS FOR TILTROTOR AIRCRAFT

(71) Applicant: Textron Innovations Inc., Providence, RI (US)

(72) Inventors: John Elton Brunken, Jr., Fort Worth, TX (US); Andrew G. Baines, Fort Worth, TX (US); James Everett Kooiman, Fort Worth, TX (US); John Richard McCullough, Fort Worth, TX (US); Brett Rodney Zimmerman, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 487 days.

This patent is subject to a terminal disclaimer.

(21) Appl. No.: 15/722,163

(22) Filed: Oct. 2, 2017

(65) Prior Publication Data
US 2019/0100297 A1   Apr. 4, 2019

(51) Int. Cl.
| B64C 1/26 | (2006.01) |
| B64C 1/06 | (2006.01) |
| B64C 29/00 | (2006.01) |
| B64C 3/18 | (2006.01) |
| B64C 1/14 | (2006.01) |

(Continued)

(52) U.S. Cl.
CPC ............... B64C 1/26 (2013.01); B64C 1/061 (2013.01); B64C 1/064 (2013.01); B64C 1/1407 (2013.01); B64C 3/185 (2013.01); B64C 3/187 (2013.01); B64C 29/0033 (2013.01); B64C 27/26 (2013.01); B64C 27/28 (2013.01)

(58) Field of Classification Search
CPC ........... B64C 1/26; B64C 1/064; B64C 3/185; B64C 1/1407; B64C 3/187; B64C 29/0033; B64C 1/061; B64C 27/26; B64C 27/28
See application file for complete search history.

(56) References Cited

U.S. PATENT DOCUMENTS

| 3,119,441 A | 1/1964 | Furry | |
| 7,887,009 B2 * | 2/2011 | Keeler, Jr. | ................. B64C 1/26 244/119 |

(Continued)

FOREIGN PATENT DOCUMENTS

FR   2991287 A1   12/2013

OTHER PUBLICATIONS

European Search Report; Application No. 18195577.4, EPO, dated Feb. 21, 2019.

*Primary Examiner* — Valentina Xavier
(74) *Attorney, Agent, or Firm* — Lawrence Youst PLLC

(57) ABSTRACT

An airframe for a tiltrotor aircraft includes a wing airframe including a rib, a fuselage airframe including a fore-aft overhead beam and a cradle support assembly. The cradle support assembly includes a forward wing support coupled to the fore-aft overhead beam and the wing airframe and an aft wing support coupled to the fore-aft overhead beam and the wing airframe. The rib, the fore-aft overhead beam, the forward wing support and the aft wing support are substantially aligned to form a wing-fuselage integrated airframe beam assembly to support the wing airframe.

20 Claims, 9 Drawing Sheets

(51) Int. Cl.
*B64C 27/28* (2006.01)
*B64C 27/26* (2006.01)

(56) References Cited

U.S. PATENT DOCUMENTS

| | | | |
|---|---|---|---|
| 8,991,762 | B2 | 3/2015 | Voss et al. |
| 9,656,736 | B2 | 5/2017 | Guillemaut et al. |
| 10,040,534 | B2* | 8/2018 | Kooiman ............ B64C 29/0033 |
| 2008/0272236 | A1 | 11/2008 | Rawdon et al. |
| 2011/0036941 | A1* | 2/2011 | Cazals ...................... B64C 3/38 |
| | | | 244/46 |
| 2013/0299636 | A1* | 11/2013 | Durand .................. B64C 3/185 |
| | | | 244/123.1 |
| 2014/0231586 | A1* | 8/2014 | Brown ...................... B64C 1/26 |
| | | | 244/119 |
| 2016/0152315 | A1 | 6/2016 | Gonzalez et al. |
| 2016/0185439 | A1 | 6/2016 | Gonzalez et al. |
| 2016/0229513 | A1 | 8/2016 | Scheel et al. |
| 2016/0311515 | A1 | 10/2016 | Guillemaut et al. |
| 2017/0158306 | A1 | 6/2017 | Kooiman et al. |
| 2018/0029689 | A1* | 2/2018 | Murta .................... B64C 3/185 |

* cited by examiner

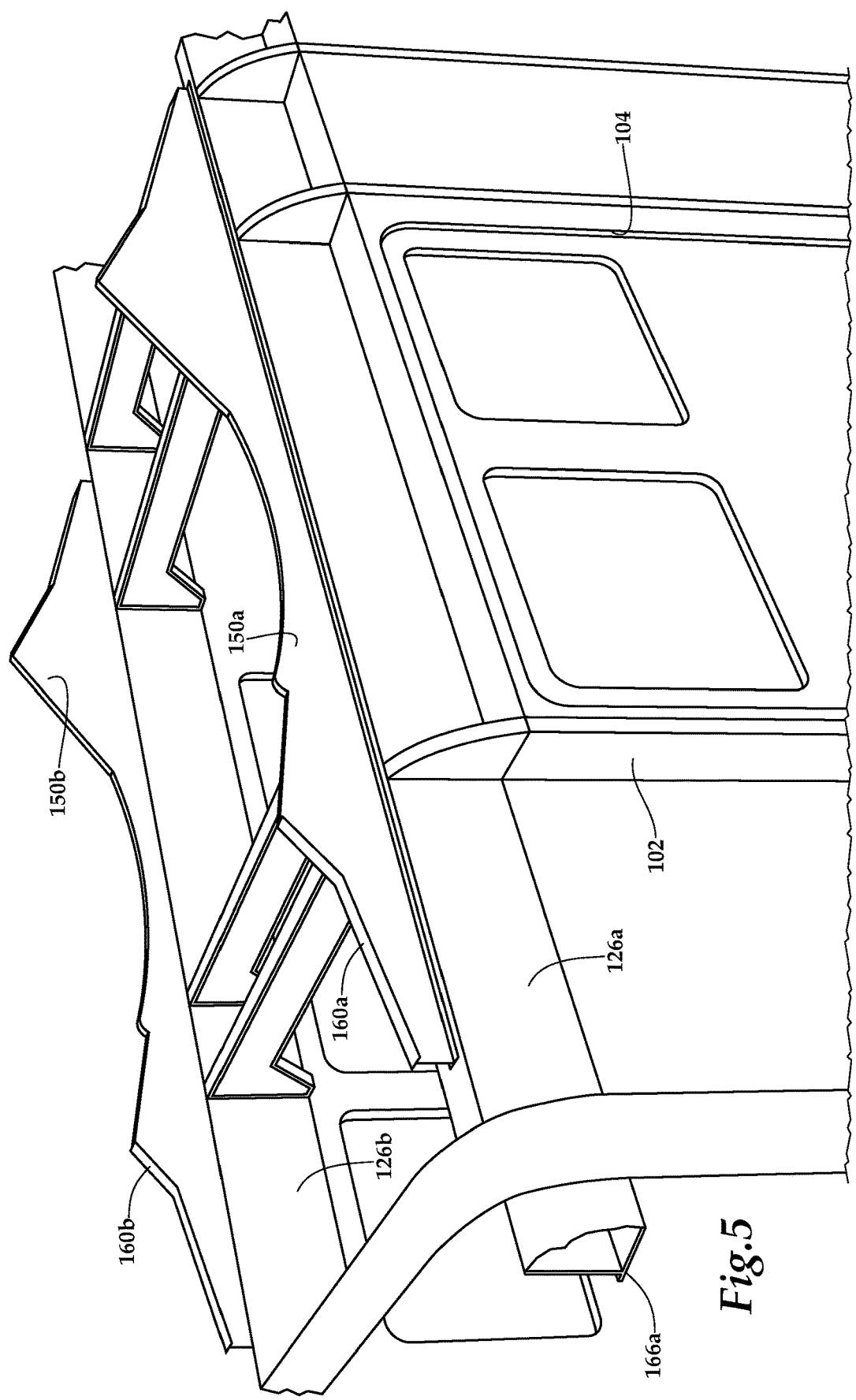

WING-FUSELAGE INTEGRATED AIRFRAME BEAMS FOR TILTROTOR AIRCRAFT

TECHNICAL FIELD OF THE DISCLOSURE

The present disclosure relates, in general, to wing mount assemblies for tiltrotor aircraft having a forward flight mode and a vertical takeoff and landing flight mode and, in particular, to airframe beam assemblies integrating the wing and fuselage of a tiltrotor aircraft to provide structural support thereto.

BACKGROUND

Tiltrotor aircraft typically include multiple propulsion assemblies that are positioned near the outboard ends of a wing. Each propulsion assembly may include an engine and transmission that provide torque and rotational energy to a drive shaft that rotates a proprotor assembly including a hub assembly and a plurality of proprotor blades. Typically, a pylon assembly, which includes the proprotor assembly, is rotatable relative to the wing such that the proprotor blades have a generally horizontal plane of rotation providing vertical lift for takeoff, hovering and landing, much like a conventional helicopter, and a generally vertical plane of rotation providing forward thrust for cruising in forward flight with the wing providing lift, much like a conventional propeller driven airplane. In addition, tiltrotor aircraft can be operated in configurations between the helicopter flight mode and the airplane flight mode, which may be referred to as conversion flight mode.

Physical structures have natural frequencies of vibration that can be excited by forces applied thereto as a result of operating parameters and/or environmental conditions. These frequencies are determined, at least in part, by the materials and geometrical dimensions of the structures. In the case of tiltrotor aircraft, certain structures having critical natural frequencies include the fuselage, the wing and various elements of the propulsion assemblies. An important environmental condition experienced by tiltrotor aircraft is forward airspeed, which may induce proprotor aeroelastic instability, such as proprotor whirl flutter, which may couple to the wing of a tiltrotor aircraft. In the event of such coupling, the wing can become unstable, leading to excessive vibration, flutter or structural failure. To prevent such coupling, most wing airframes are designed to be stiff and light. For example, the wing of a conventional tiltrotor aircraft may include a torque box that is structurally suited to absorb wing deflections and help ensure wing stability. Nonetheless, it has been found that forward airspeed-induced proprotor aeroelastic instability is a limiting factor relating to the maximum airspeed of tiltrotor aircraft in forward flight mode.

In current aircraft, the wing and fuselage are separate structures that, while physically linked, are not integrated with one another. In addition, wings are typically mounted to the fuselage without supporting structure designed to distribute wing loads across an enlarged area of the fuselage airframe, thus subjecting the area of the fuselage adjacent or directly underneath the wing to excessive loads. Further, such loads on the fuselage may be exacerbated by aeroelastic instability-induced wing deflections and can become particularly problematic if structurally weakening features, such as a door opening, are positioned underneath the wing.

SUMMARY

In a first aspect, the present disclosure is directed to an airframe for a tiltrotor aircraft including a wing airframe including a rib, a fuselage airframe including a fore-aft overhead beam and a cradle support assembly. The cradle support assembly includes a forward wing support coupled to the fore-aft overhead beam and the wing airframe and an aft wing support coupled to the fore-aft overhead beam and the wing airframe. The rib, the fore-aft overhead beam, the forward wing support and the aft wing support are substantially aligned to form a wing-fuselage integrated airframe beam assembly to support the wing airframe.

In some embodiments, the wing airframe may include a forward spar, an aft spar, a top skin, a bottom skin and a plurality of ribs to form a torque box structure. In certain embodiments, the wing-fuselage integrated airframe beam assembly may form a generally vertical plane with the side wall of the fuselage airframe. In some embodiments, the fuselage airframe may form a door opening underneath the wing airframe. In certain embodiments, the cradle support assembly may extend at least as forward as the forward edge of the door opening and at least as aft as the aft edge of the door opening. In some embodiments, the wing airframe may include a plurality of ribs spaced spanwise along the wing airframe, and the rib of the wing-fuselage integrated airframe beam assembly may be proximate one of the outboard edges of the fuselage airframe. In certain embodiments, the cradle support assembly may include wing contour ridges protruding vertically from the fore-aft overhead beam. In some embodiments, the wing contour ridges may be integral with the fore-aft overhead beam. In certain embodiments, the cradle support assembly may include one or more shear ties coupling an underside of the wing airframe to the fore-aft overhead beam.

In some embodiments, the cradle support assembly may have a top side forming a beam cap. In certain embodiments, the cradle support assembly may include one or more support straps coupling the beam cap to the top skin of the wing airframe. In some embodiments, the top side of the cradle support assembly and the top skin of the wing airframe may form an aerodynamic profile. In certain embodiments, the bottom edge of the forward wing support may be coupled to the fore-aft overhead beam and the aft edge of the forward wing support may be coupled to the forward spar of the wing airframe. In some embodiments, the bottom edge of the aft wing support may be coupled to the fore-aft overhead beam and the forward edge of the aft wing support may be coupled to the aft spar of the wing airframe. In certain embodiments, the wing-fuselage integrated airframe beam assembly may form a generally vertical plane extending longitudinally relative to the tiltrotor aircraft.

In a second aspect, the present disclosure is directed to a tiltrotor aircraft including a fuselage supported by a fuselage airframe. The fuselage airframe includes first and second fore-aft overhead beams. The tiltrotor aircraft includes a wing coupled to the fuselage and supported by a wing airframe. The wing airframe includes first and second ribs. The tiltrotor aircraft includes a first cradle support assembly including a first forward wing support coupled to the first fore-aft overhead beam and the wing airframe and a first aft wing support coupled to the first fore-aft overhead beam and the wing airframe. The tiltrotor aircraft includes a second cradle support assembly including a second forward wing support coupled to the second fore-aft overhead beam and the wing airframe and a second aft wing support coupled to the second fore-aft overhead beam and the wing airframe. The first rib, the first fore-aft overhead beam, the first forward wing support and the first aft wing support are substantially aligned to form a first wing-fuselage integrated airframe beam assembly and the second rib, the second fore-aft overhead beam, the second forward wing support and the second aft wing support are substantially aligned to form a second wing-fuselage integrated airframe beam assembly, the wing-fuselage integrated airframe beam assemblies supporting the wing.

In some embodiments, the first and second wing-fuselage integrated airframe beam assemblies may include left and right wing-fuselage integrated airframe beam assemblies, respectively. In certain embodiments, the wing may be subject to deflection in response to the aeroelastic movement of propulsion assemblies coupled thereto, and the wing-fuselage integrated airframe beam assemblies may reduce deflection of the wing. In some embodiments, the wing-fuselage integrated airframe beam assemblies may increase pitch stiffness of the wing. In certain embodiments, the wing-fuselage integrated airframe beam assemblies may be substantially parallel to one another. In some embodiments, the wing-fuselage integrated airframe beam assemblies may extend longitudinally relative to the fuselage.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIG. 5 is an isometric view of a fuselage airframe having fore-aft overhead beams including integral wing contour ridges in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
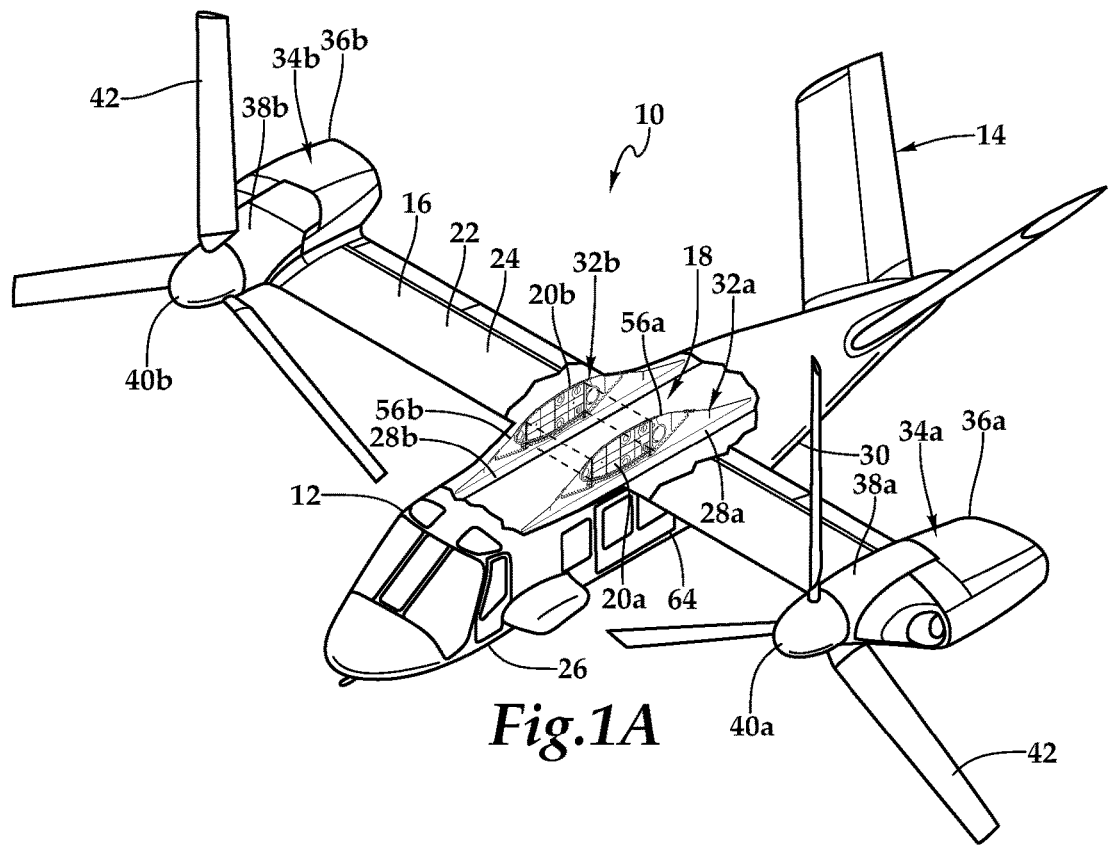
FIGS. 1A-1C are schematic illustrations of a tiltrotor aircraft having an integrated wing mount assembly in accordance with embodiments of the present disclosure.
Figure 1B:
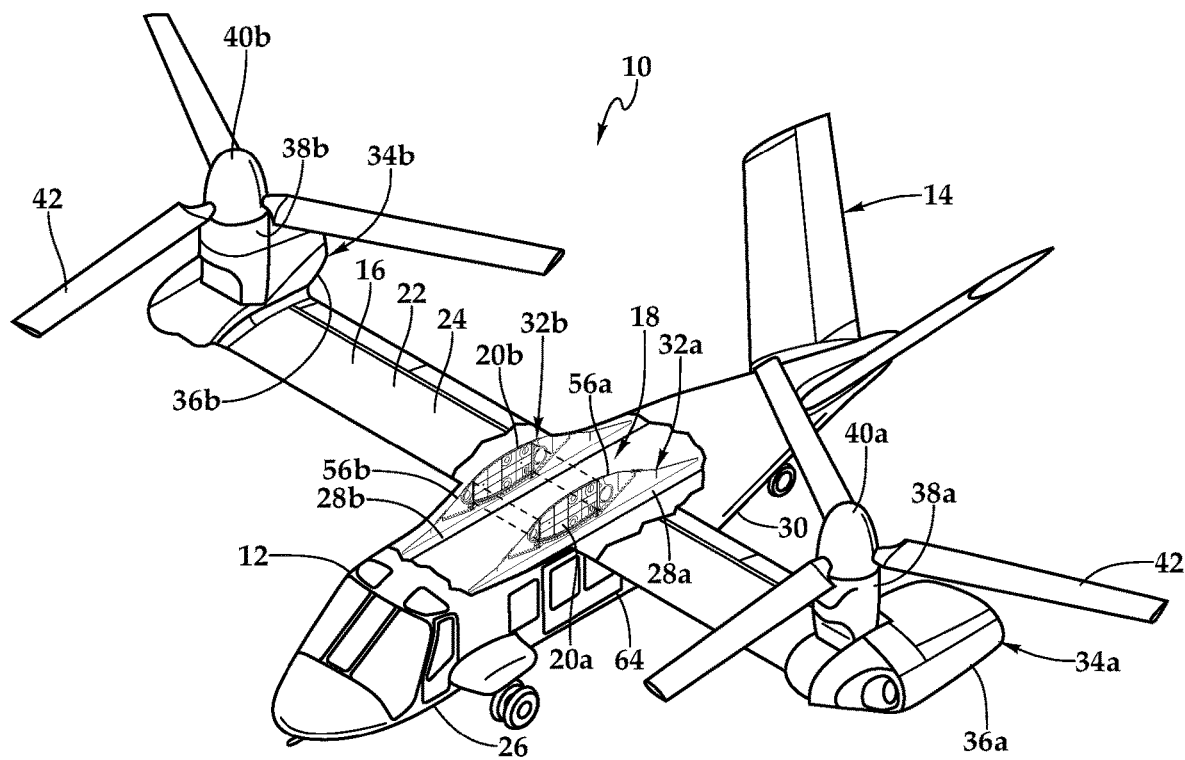
Figure 1C:
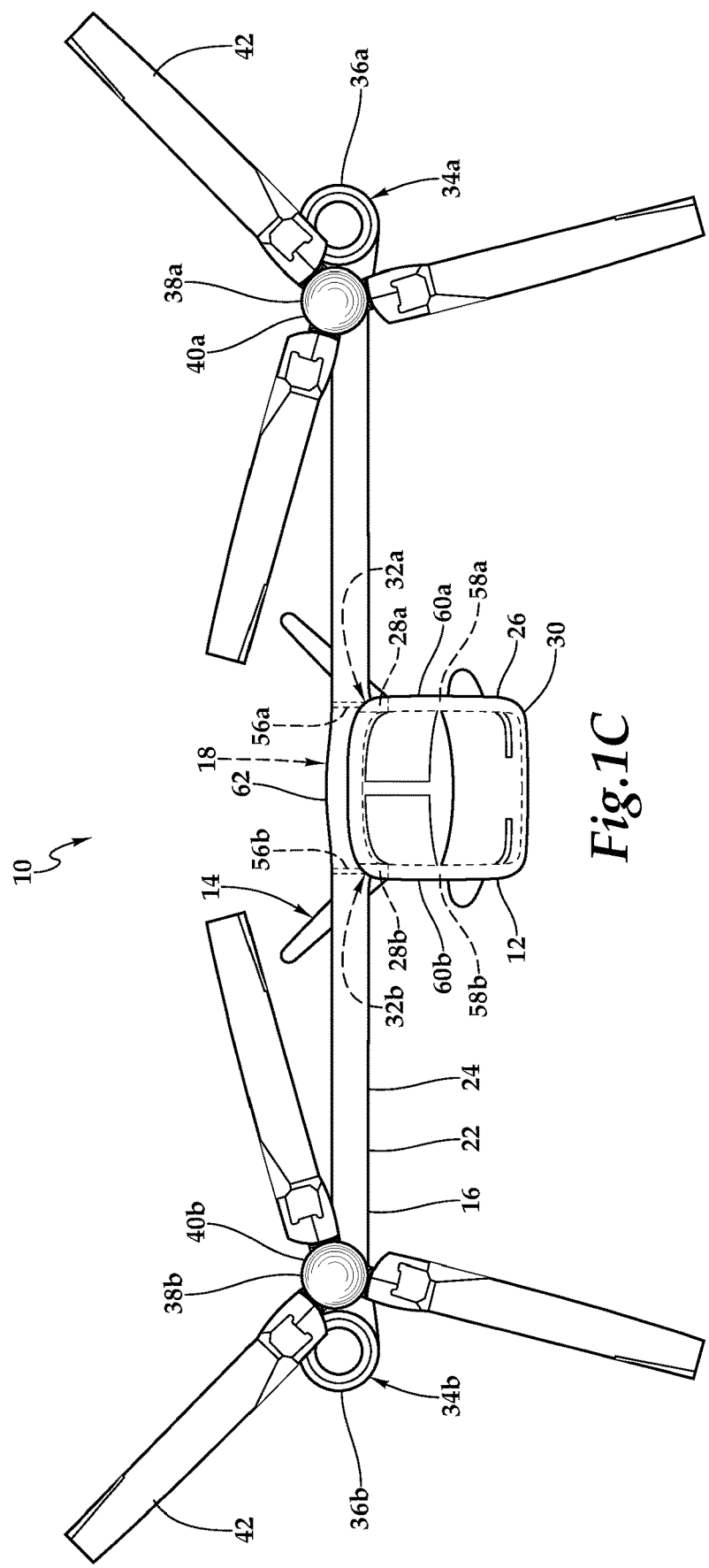

Referring to FIGS. 1A-1C in the drawings, a tiltrotor aircraft is schematically illustrated and generally designated 10. Tiltrotor aircraft 10 includes a fuselage 12 and a tail assembly 14 having control surfaces operable for horizontal and/or vertical stabilization during forward flight. A wing 16 is supported by an integrated wing mount assembly 18 that may be either fixed or rotate relative to fuselage 12 to enable tiltrotor aircraft 10 to convert to a storage configuration. Together, fuselage 12, tail assembly 14 and wing 16 as well as their various frames, supports, longerons, stringers, bulkheads, spars, ribs, including ribs 20a, 20b, and skins, including wing skin assembly 22, may be considered to be the airframe of tiltrotor aircraft 10. The airframe of tiltrotor aircraft 10 includes a wing airframe 24 including spars, ribs 20a, 20b and wing skin assembly 22, and a fuselage airframe 26 including fore-aft overhead beams 28a, 28b and a fuselage skin assembly 30. Integrated wing mount assembly 18 integrates, or fuses, wing airframe 24 with fuselage airframe 26 to form left and right wing-fuselage integrated airframe beam assemblies 32a, 32b, which strengthen the structural integrity of both fuselage 12 and wing 16.

Coupled to the outboard ends of wing 16 are propulsion assemblies 34a, 34b. Propulsion assemblies 34a, 34b include fixed nacelles 36a, 36b, respectively, each of which preferably houses an engine and a fixed portion of a drive system. A pylon assembly 38a is rotatable relative to fixed nacelle 36a and wing 16 between a generally horizontal orientation, as best seen in FIG. 1A, and a generally vertical orientation, as best seen in FIG. 1B. Pylon assembly 38a includes a rotatable portion of the drive system and a proprotor assembly 40a that is rotatable responsive to torque and rotational energy provided via the engine and drive system. Likewise, a pylon assembly 38b is rotatable relative to fixed nacelle 36b and wing 16 between a generally horizontal orientation, as best seen in FIG. 1A, and a generally vertical orientation, as best seen in FIG. 1B. Pylon assembly 38b includes a rotatable portion of the drive system and a proprotor assembly 40b that is rotatable responsive to torque and rotational energy provided via the engine and drive system. In the illustrated embodiment, proprotor assemblies 40a, 40b each include three proprotor blade assemblies 42. It should be understood by those having ordinary skill in the art, however, that proprotor assemblies 40a, 40b could alternatively have a different number of proprotor blades, either less than or greater than three. In addition, it should be understood that the position of pylon assemblies 38a, 38b, the angular velocity or revolutions per minute (RPM) of proprotor assemblies 40a, 40b, the pitch of proprotor blades 42 and the like are controlled by the pilot of tiltrotor aircraft 10 and/or the flight control system to selectively control the direction, thrust and lift of tiltrotor aircraft 10 during flight.

FIG. 1A illustrates tiltrotor aircraft 10 in a forward flight mode or airplane flight mode, in which proprotor assemblies 40a, 40b are positioned to rotate in a substantially vertical plane to provide a forward thrust while a lifting force is supplied by wing 16 such that tiltrotor aircraft 10 flies much like a conventional propeller driven aircraft. FIG. 1B illustrates tiltrotor aircraft 10 in a vertical takeoff and landing (VTOL) flight mode or helicopter flight mode, in which proprotor assemblies 40a, 40b are positioned to rotate in a substantially horizontal plane to provide a vertical thrust such that tiltrotor aircraft 10 flies much like a conventional helicopter. During operation, tiltrotor aircraft 10 may convert from helicopter flight mode to airplane flight mode following vertical takeoff and/or hover. Likewise, tiltrotor aircraft 10 may convert back to helicopter flight mode from airplane flight mode for hover and/or vertical landing. In addition, tiltrotor aircraft 10 can perform certain flight maneuvers with proprotor assemblies 40a, 40b positioned between airplane flight mode and helicopter flight mode, which can be referred to as conversion flight mode.

Preferably, each fixed nacelle 36a, 36b houses a drive system, such as an engine and transmission, for supplying torque and rotational energy to a respective proprotor assembly 40a, 40b. In such embodiments, the drive systems of each fixed nacelle 36a, 36b may be coupled together via one or more drive shafts located in wing 16 such that either drive system can serve as a backup to the other drive system in the event of a failure. Alternatively or additionally, fuselage 12 may include a drive system, such as an engine and transmission, for providing torque and rotational energy to each proprotor assembly 40a, 40b via one or more drive shafts located in wing 16. In tiltrotor aircraft having both nacelle and fuselage mounted drive systems, the fuselage mounted drive system may serve as a backup drive system in the event of failure of either or both of the nacelle mounted drive systems.

During high speed operations in airplane flight mode, the forward airspeed of tiltrotor aircraft 10 may induce proprotor aeroelastic movement or instability, such as propeller whirl flutter, which may couple to wing 16 and lead to failures. The aeroelastic movement of propulsion assemblies 34a, 34b, and of pylon assemblies 38a, 38b in particular, may be caused by aeroelastic phenomena, including dynamic aeroelastic phenomena, which involves interactions among inertial, aerodynamic and elastic forces, and/or static aeroelastic phenomena, which involve interactions between aerodynamic and elastic forces. The flexibility of modern aircraft is responsible, at least in part, for the various types of aeroelastic phenomena. Aeroelastic phenomena arise when structural deformations or movements in aircraft components induce additional aerodynamic forces. These additional aerodynamic forces may produce additional structural deformations or movements that induce still greater aerodynamic forces. Such interactions may tend to become smaller over time until a condition of stable equilibrium is reached, or they may tend to diverge, which can destroy the structure.

Left and right wing-fuselage integrated airframe beam assemblies 32a, 32b each include a cradle support assembly 56a, 56b into which ribs 20a, 20b are mounted, respectively. Rib 20a, cradle support assembly 56a and fore-aft overhead beam 28a are substantially aligned and integrated into a web-like structure to form left wing-fuselage integrated airframe beam assembly 32a. Rib 20b, cradle support assembly 56b and fore-aft overhead beam 28b are substantially aligned and integrated into a web-like structure to form right wing-fuselage integrated airframe beam assembly 32b. As best seen in FIG. 1C, fuselage airframe 26 includes side walls 58a, 58b, which may be formed from fuselage skin assembly 30, beams, panels and/or other structural components. Wing-fuselage integrated airframe beam assemblies 32a, 32b each form generally vertical planes with side walls 58a, 58b of fuselage airframe 26, respectively, thereby enhancing the structural integrity of fuselage 12 and wing 16. In addition, while wing airframe 24 may include any number of ribs, ribs 20a, 20b, which form part of wing-fuselage integrated airframe beam assemblies 32a, 32b, are proximate or directly above outboard edges 60a, 60b of fuselage airframe 26, respectively. Left and right wing-fuselage integrated airframe beam assemblies 32a, 32b are substantially parallel to one another and form generally vertical planes extending longitudinally relative to tiltrotor aircraft 10.

By integrating wing airframe 24 with fuselage airframe 26, wing-fuselage integrated airframe beam assemblies 32a, 32b provide support for wing 16, including by stabilizing wing 16 against wing deflections caused by aeroelastic phenomena or instability of propulsion assemblies 34a, 34b. Wing-fuselage integrated airframe beam assemblies 32a, 32b provide a stiff wing pitch restraint that reduces pitching and/or twisting of wing 16 resulting from such aeroelastic phenomena as well as other causes. By increasing the pitch stiffness of center portion 62 of wing 16, wing-fuselage integrated airframe beam assemblies 32a, 32b also protect the structural integrity of the portion of fuselage 12 underneath wing 16, which in the illustrated embodiment is structurally compromised due to the presence of a door opening 64. Wing-fuselage integrated airframe beam assemblies 32a, 32b also help to support the weight of wing 16 itself.

It should be appreciated that tiltrotor aircraft 10 is merely illustrative of a variety of aircraft that can implement the embodiments disclosed herein. Indeed, wing-fuselage integrated airframe beam assemblies 32a, 32b may be utilized on any aircraft having one or more wings. Other aircraft implementations can include hybrid aircraft, tiltwing aircraft, quad tiltrotor aircraft, unmanned aircraft, gyrocopters, airplanes, jets and the like. As such, those of ordinary skill in the art will recognize that wing-fuselage integrated airframe beam assemblies 32a, 32b can be integrated into a variety of aircraft configurations. Although wing-fuselage integrated airframe beam assemblies 32a, 32b are illustrated as being implemented on a unitary wing that spans both sides of fuselage 12, wing-fuselage integrated airframe beam assemblies 32a, 32b may be utilized in two or more structurally separate or semi-separate wings of the same aircraft. It should be appreciated that even though aircraft are particularly well-suited to implement the embodiments of the present disclosure, non-aircraft vehicles and devices can also implement the embodiments, including, but not limited to, automobiles or land-based vehicles.

Figure 2:
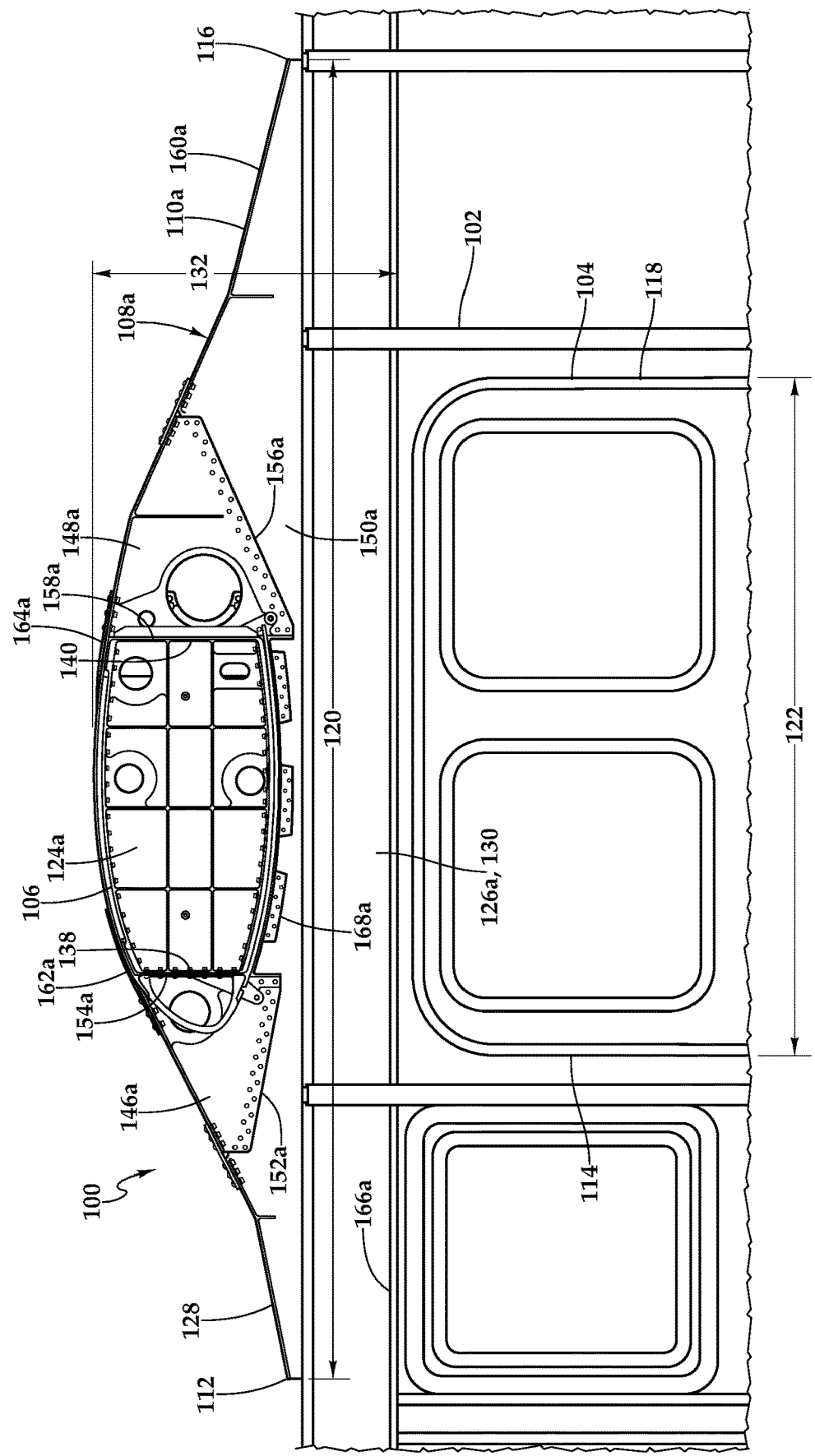
FIG. 2 is a side view of a wing-fuselage integrated airframe beam assembly mounted over a door opening in accordance with embodiments of the present disclosure.
Figure 3:
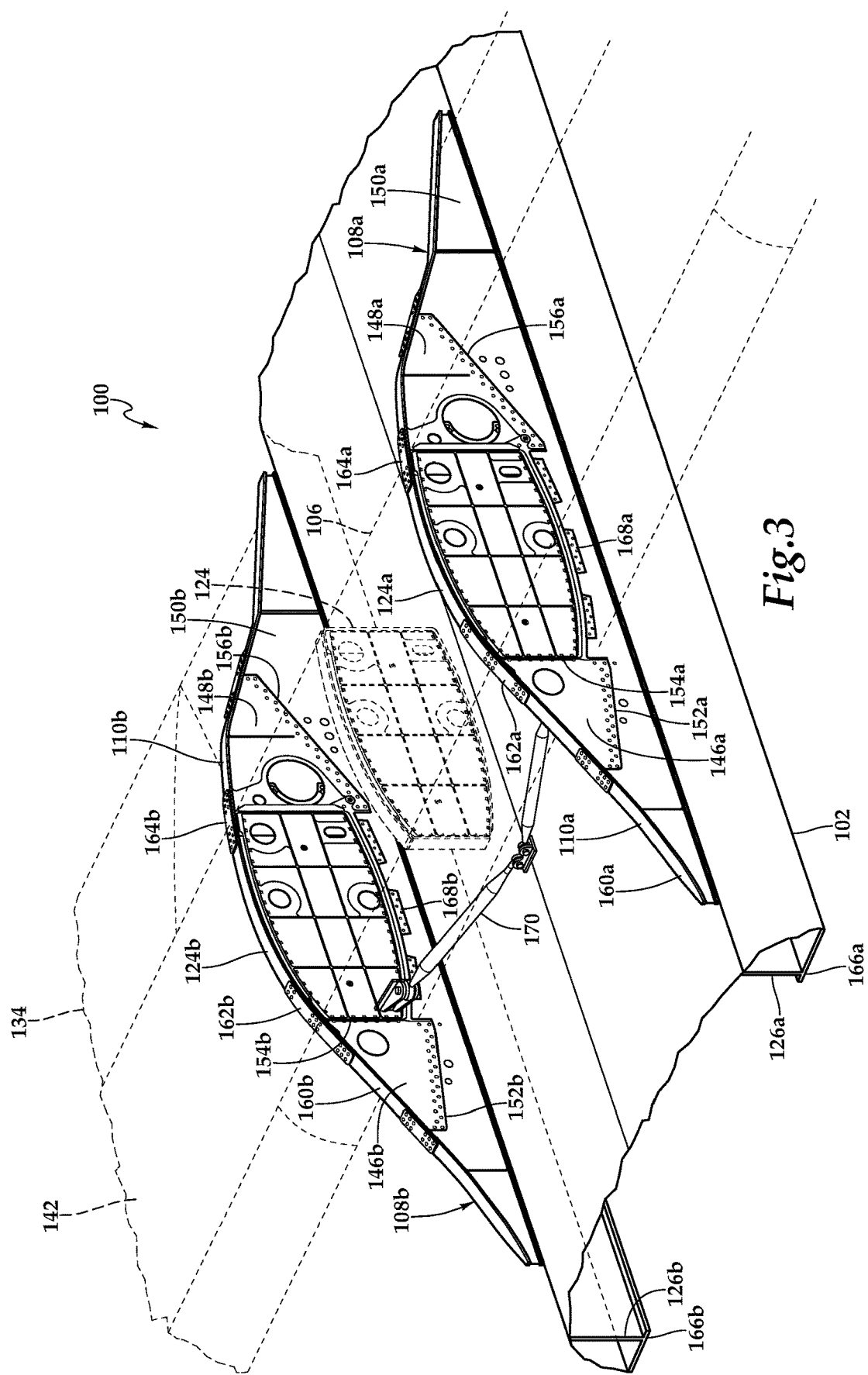
FIG. 3 is an isometric view of an integrated wing mount assembly in accordance with embodiments of the present disclosure.
Figure 4A:
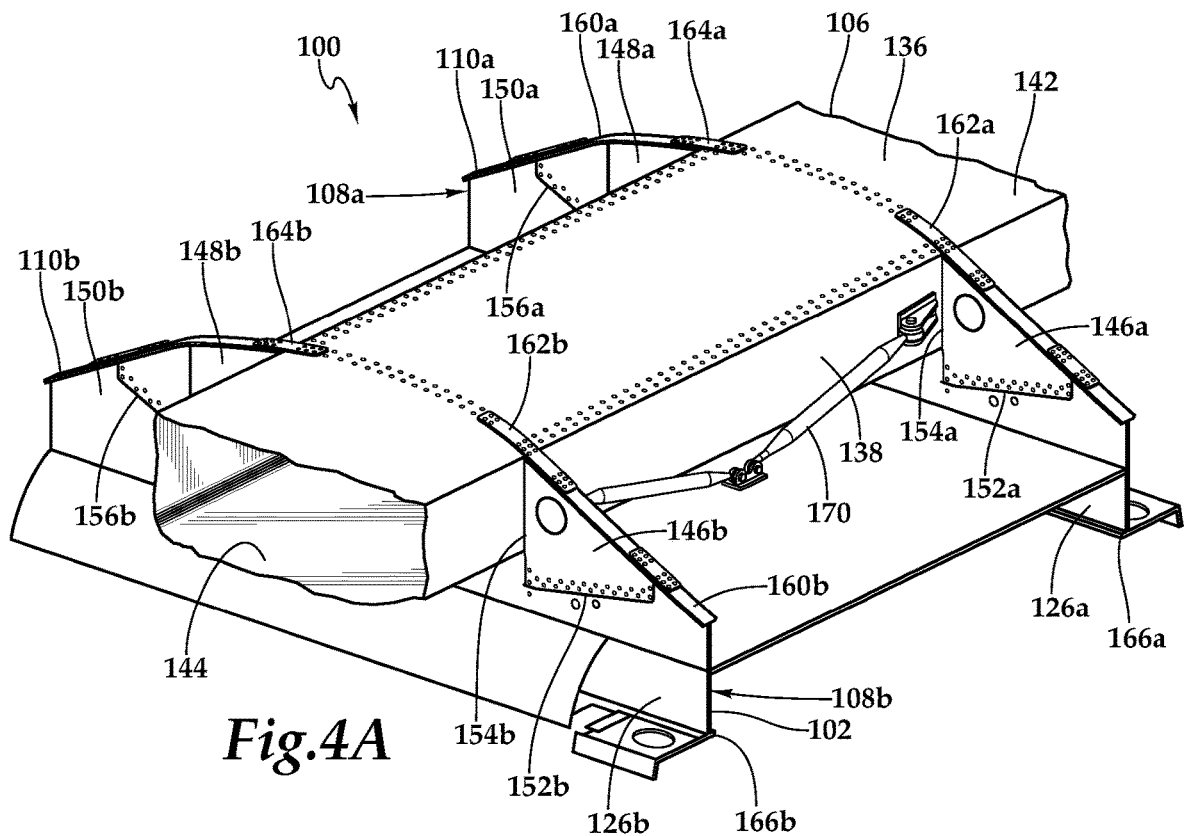
FIGS. 4A-4E are various views of an integrated wing mount assembly in accordance with embodiments of the present disclosure.
Figure 4B:
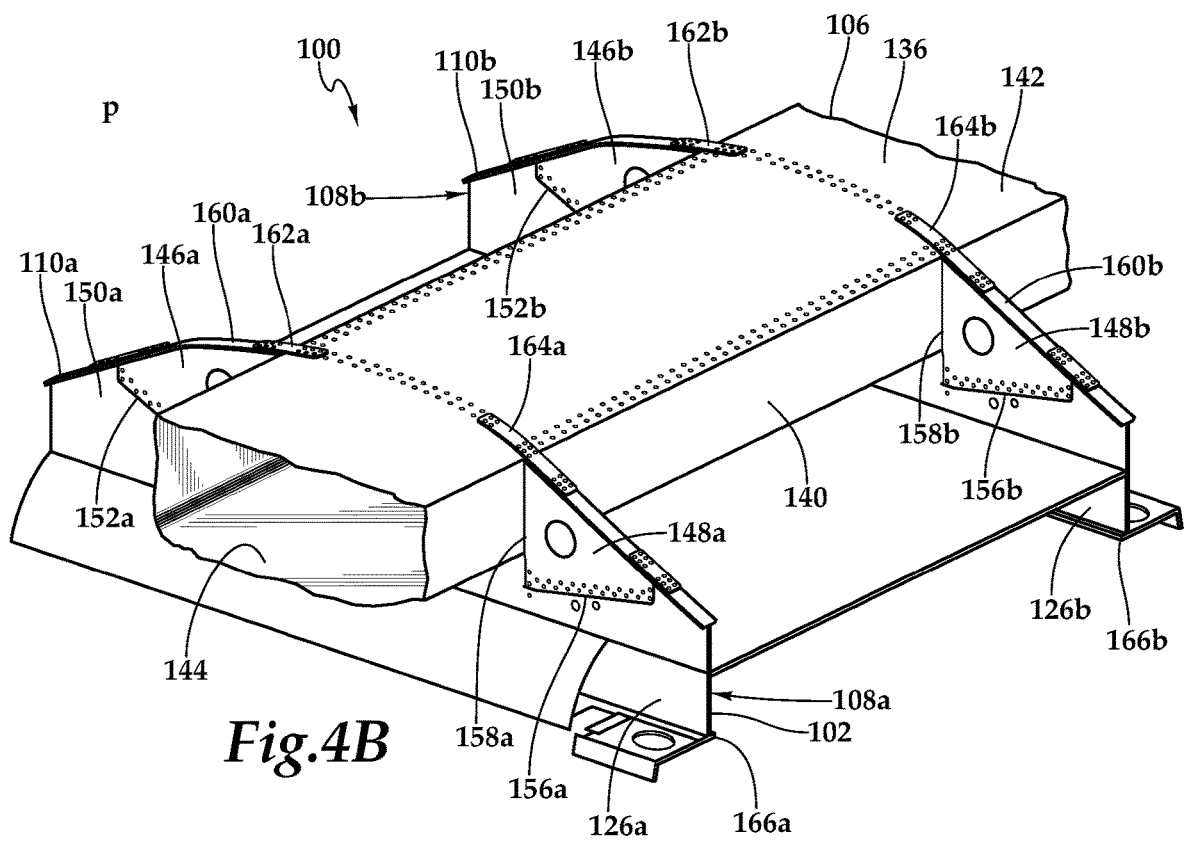
Figure 4C:
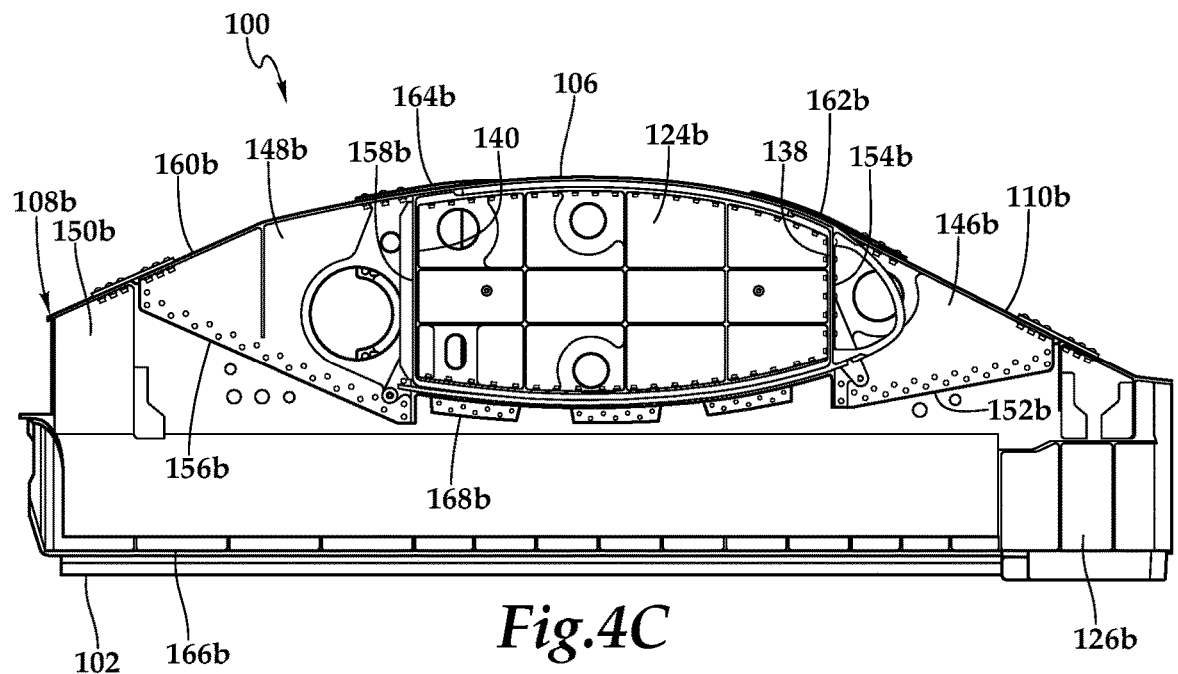
Figure 4D:
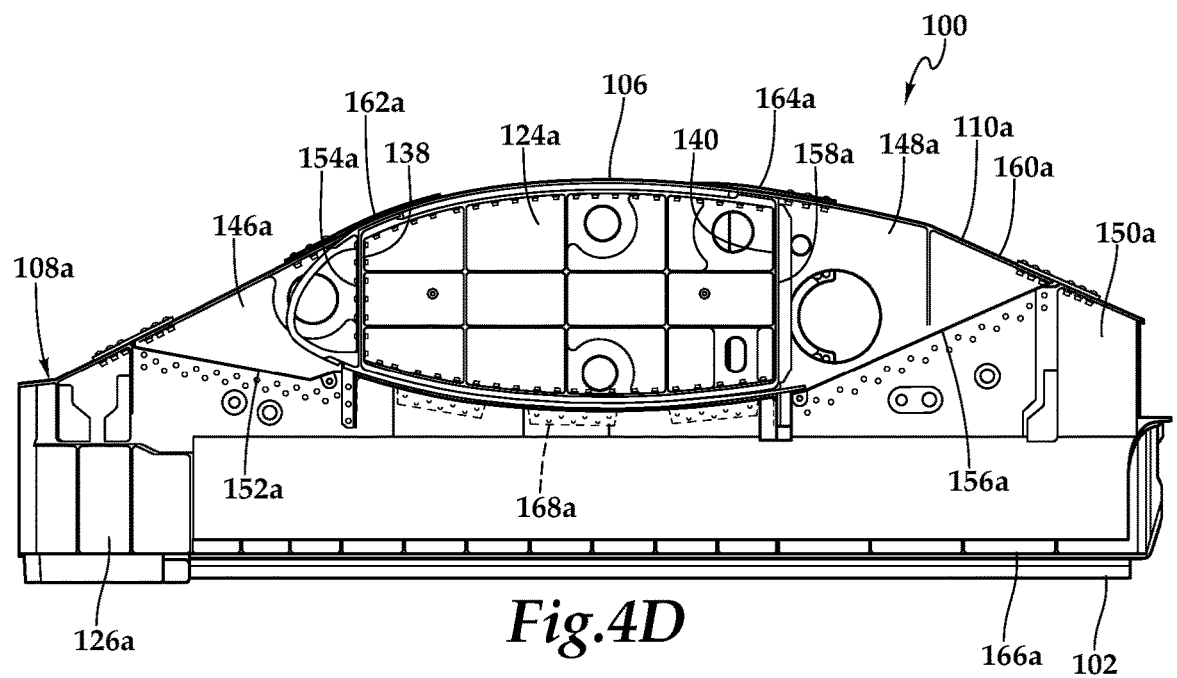
Figure 4E:
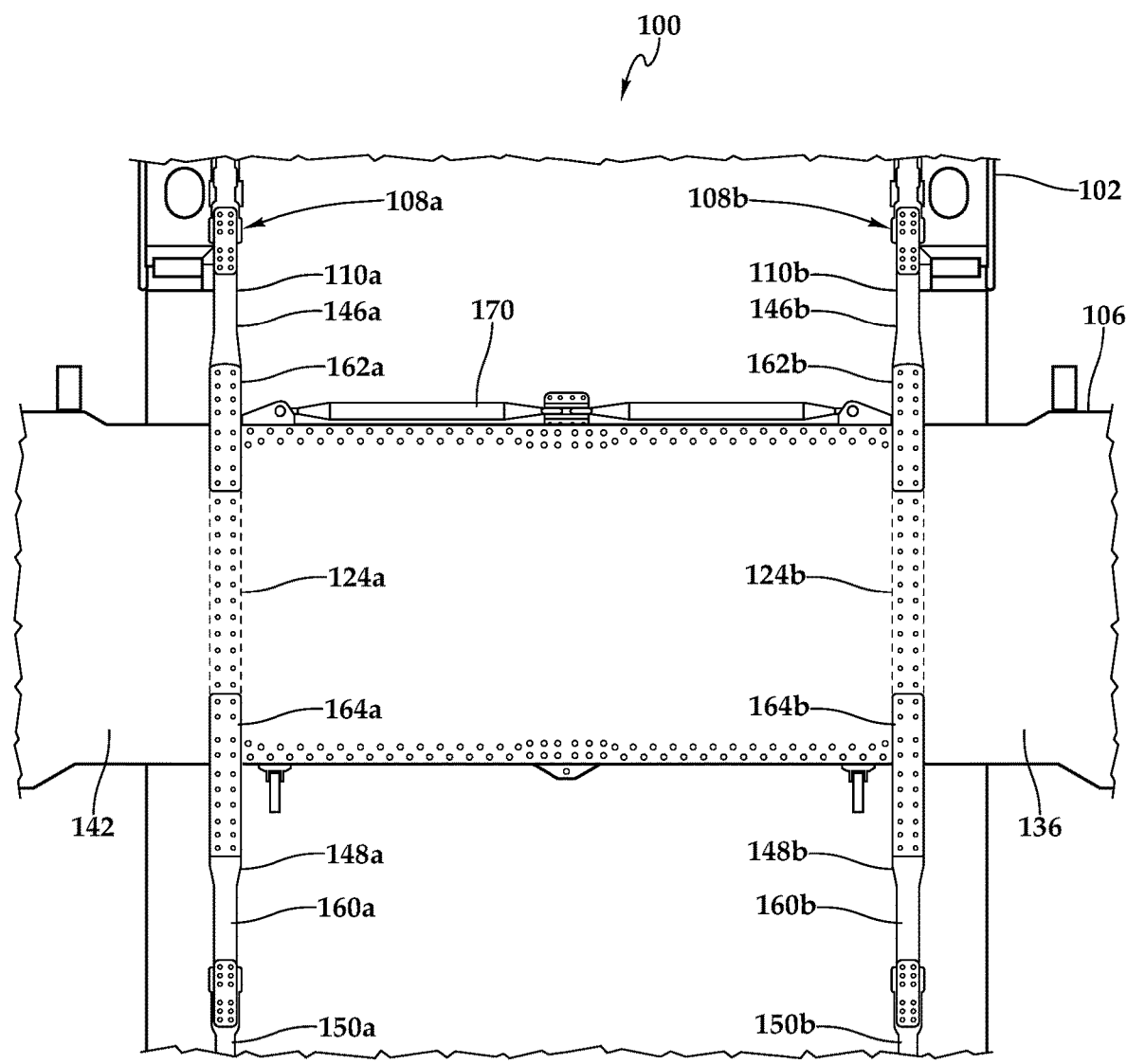

Referring to FIG. 2 in the drawings, an integrated wing mount assembly is schematically illustrated and generally designated 100. Fuselage airframe 102 forms door opening 104 underneath wing airframe 106. Depending on the particular aircraft, door opening 104 may be fully or partially underneath wing airframe 106. Door opening 104 may be considered a structural weakness that increases the fuselage airframe's vulnerability to loads applied thereon, including the weight of the wing and wing deflection caused by aeroelastic phenomena. FIG. 2 illustrates left wing-fuselage integrated airframe beam assembly 108a, including cradle support assembly 110a. Forward edge 112 of cradle support assembly 110a extends forward of forward edge 114 of door opening 104 and aft edge 116 of cradle support assembly 110a extends aft of aft edge 118 of door opening 104, thus providing adequate support for the wing and structural reinforcement for fuselage airframe 102. Integrated wing mount assembly 100 distributes the load of the wing over a longitudinal span 120 of fuselage airframe 102 that is longer than a longitudinal length 122 of door opening 104. In other embodiments, longitudinal span 120 of cradle support assembly 110a may be any length equal to or greater than longitudinal length 122 of door opening 104.

Rib 124a, cradle support assembly 110a and fore-aft overhead beam 126a are fused, integrated or otherwise coupled in any manner to form wing-fuselage integrated airframe beam assembly 108a. Wing-fuselage integrated airframe beam assembly 108a has an upper beam portion 128 that includes rib 124a and cradle support assembly 110a. Wing-fuselage integrated airframe beam assembly 108a also has a lower beam portion 130 that includes fore-aft overhead beam 126a of fuselage airframe 102. Thus, wing-fuselage integrated airframe beam assembly 108a integrates portions of both wing airframe 106 (e.g., rib 124a) and fuselage airframe 102 (e.g., fore-aft overhead beam 126a) into a tall, deep and efficient beam providing sufficient stiffness to carry the bending, twisting and other deflection motions of the wing across and beyond longitudinal length 122 of door opening 104. In some embodiments, wing-fuselage integrated airframe beam assembly 108a may have a height 132 in a range between 20 and 40 inches, such as approximately 30 inches. Depending on the particular aircraft, door opening 104 may be on either or both sides of fuselage airframe 102.

Referring to FIGS. 3, 4A-4E and 5 in the drawings, left and right wing-fuselage integrated airframe beam assemblies 108a, 108b of integrated wing mount assembly 100 are shown in various views. Right wing-fuselage integrated airframe beam assembly 108b is substantially similar to left wing-fuselage integrated airframe beam assembly 108a. For sake of efficiency, certain features were disclosed in FIG. 2 only with regard to left wing-fuselage integrated airframe beam assembly 108a. One having ordinary skill in the art, however, will fully appreciate an understanding of right wing-fuselage integrated airframe beam assembly 108b based upon the disclosure of left wing-fuselage integrated airframe beam assembly 108a. Wing airframe 106, which supports wing 134, forms a torque box structure 136 made up of forward spar 138, aft spar 140, top skin 142, bottom skin 144 and a plurality of ribs 124 such as ribs 124a, 124b, as well as other structural elements. Torque box 136 is configured to distribute loads, shears and other motions generated by the propulsion assemblies during the various flight modes.

Cradle support assemblies 110a, 110b each include forward wing supports 146a, 146b, aft wing supports 148a, 148b and wing contour ridges 150a, 150b, respectively. Wing contour ridges 150a, 150b protrude vertically from the top sides of fore-aft overhead beams 126a, 126b, respectively. Wing contour ridges 150a, 150b may be either integral with or separate components from fore-aft overhead beams 126a, 126b, respectively. Forward wing supports 146a, 146b have bottom edges 152a, 152b coupled to fore-aft overhead beams 126a, 126b via wing contour ridges 150a, 150b, respectively. In other embodiments, bottom edges 152a, 152b may couple directly to fore-aft overhead beams 126a, 126b, respectively. Forward wing supports 146a, 146b have aft edges 154a, 154b coupled to ribs 124a, 124b via forward spar 138, respectively. In other embodiments, aft edges 154a, 154b may couple directly to ribs 124a, 124b, respectively. Aft wing supports 148a, 148b have bottom edges 156a, 156b coupled to fore-aft overhead beams 126a, 126b via wing contour ridges 150a, 150b, respectively. In other embodiments, bottom edges 156a, 156b may couple directly to fore-aft overhead beams 126a, 126b, respectively. Aft wing supports 148a, 148b have forward edges 158a, 158b coupled to ribs 124a, 124b via aft spar 140, respectively. In other embodiments, forward edges 158a, 158b may couple directly to ribs 124a, 124b, respectively. While forward and aft wing supports 146a, 146b, 148a, 148b are shown as separate components from wing contour ridges 150a, 150b, in other embodiments forward and aft wing supports 146a, 148a may be integral with wing contour ridge 150a and forward and aft wing supports 146b, 148b may be integral with wing contour ridge 150b. Forward and aft wing supports 146a, 148a may be horizontally and longitudinally aligned relative to one another, as illustrated. Likewise, forward and aft wing supports 146b, 148b may be horizontally and longitudinally aligned relative to one another.

The top sides of cradle support assemblies 110a, 110b form beam caps 160a, 160b, respectively. In particular, beam cap 160a is formed from the top sides of wing contour ridge 150a, forward wing support 146a and aft wing support 148a. Beam cap 160b is formed from the top sides of wing contour ridge 150b, forward wing support 146b and aft wing support 148b. Beam caps 160a, 160b enhance the structural integrity of wing-fuselage integrated airframe beam assemblies 108a, 108b, respectively. Cradle support assembly 110a includes support straps 162a, 164a coupling beam cap 160a to top skin 142. Likewise, cradle support assembly 110b includes support straps 162b, 164b to couple beam cap 160b to top skin 142. Support straps 162a, 162b, 164a, 164b transfer load from beam caps 160a, 160b to top skin 142, thereby effectively allowing the load of beam caps 160a, 160b to pass across the top of wing 134. Lower beam caps 166a, 166b of fore-aft overhead beams 126a, 126b provide a strong bottom boundary at the top of door opening 104 so that wing-fuselage integrated airframe beam assemblies 108a, 108b act as tall, stiff and efficient beam structures for supporting wing 134, respectively. In this manner, left wing-fuselage integrated airframe beam assembly 108a, formed from aligned and integrated components rib 124a, fore-aft overhead beam 126a, forward wing support 146a and aft wing support 148a, and right wing-fuselage integrated airframe beam assembly 108b, formed from aligned and integrated components rib 124b, fore-aft overhead beam 126b, forward wing support 146b and aft wing support 148b, each extend longitudinally relative to the fuselage to support wing 134 against aeroelastic-induced deflections and protect the structural integrity of fuselage airframe 102, including door opening 104.

To transfer shear along the bottom of wing 134 and provide additional support thereto, cradle support assemblies 110a, 110b may each include one or more shear ties, or clips, 168a, 168b coupling the underside of wing airframe 106, including ribs 124a, 124b, to fore-aft overhead beams 126a, 126b, respectively. Shear ties 168a, 168b are illustrated as being coupled to fore-aft overhead beams 126a, 126b via wing contour ridges 150a, 150b, but in other embodiments shear ties 168a, 168b may be directly coupled to fore-aft overhead beams 126a, 126b, respectively. Forward and aft wing supports 146a, 146b, 148a, 148b each have a generally triangular shape so that the top sides of cradle support assemblies 110a, 110b and top skin 142 form an aerodynamic profile, which may be covered by a fairing. Forward and aft wing supports 146a, 146b, 148a, 148b, however, may have any shape or size suitable for supporting wing 134 and integrating into a beam structure. Integrated wing mount assembly 100 also includes lateral support struts 170 to provide lateral support to left and right wing-fuselage integrated airframe beam assemblies 108a, 108b. While lateral support struts 170 are illustrated as being forward of torque box 136, lateral support struts 170 may be located at either or both of the forward or aft sides of torque box 136. In other embodiments, integrated wing mount assembly 100 may include no lateral support struts at all.

Figure 6:
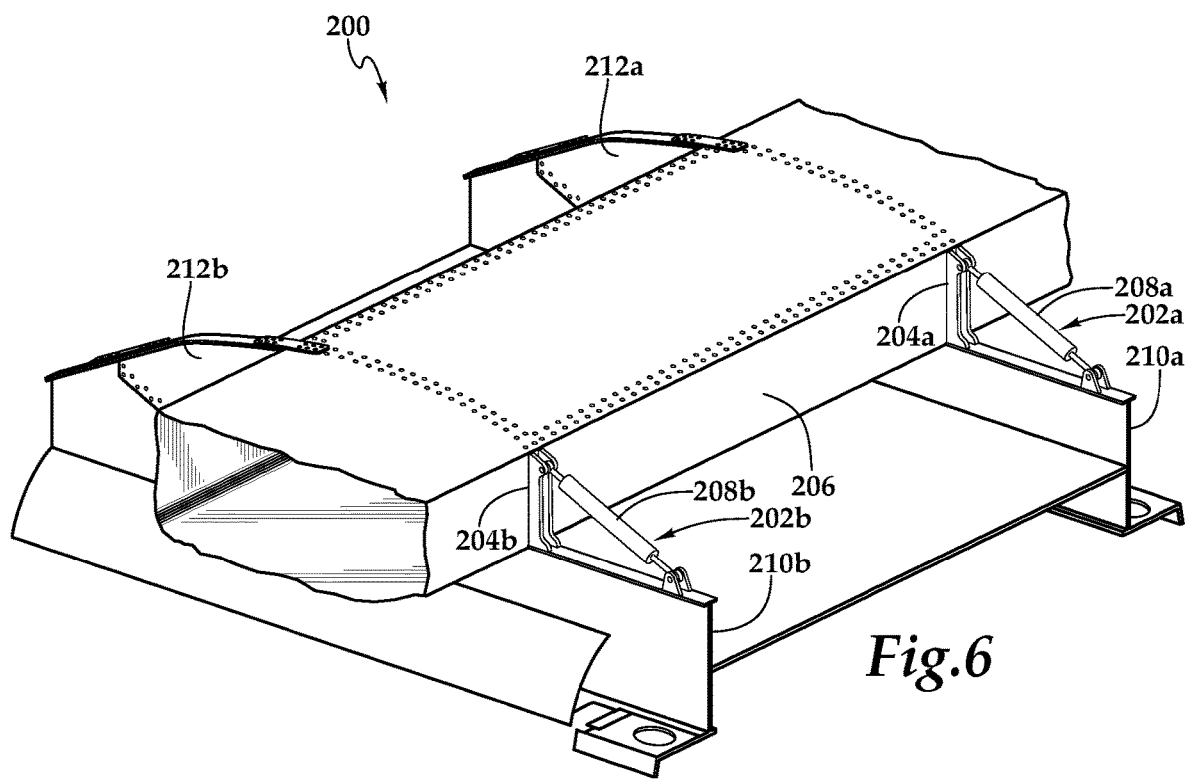
FIG. 6 is an isometric view of an integrated wing mount assembly in accordance with embodiments of the present disclosure.

Referring to FIG. 6 in the drawings, an integrated wing mount assembly is schematically illustrated and generally designated 200. In integrated wing mount assembly 200, forward wing supports have been replaced by forward strut assemblies 202a, 202b. Each forward strut assembly 202a, 202b includes a strut post 204a, 204b, respectively, oriented vertically and coupled to forward spar 206. One end of each strut 208a, 208b couples to the tops of strut posts 204a, 204b, and the other end of each strut 208a, 208b couples to fore-aft overhead beams 210a, 210b, respectively. Struts 208a, 208b may act as the caps of a beam, similar to beam caps 160a, 160b above, to provide suitable pitch stiffness for the wing. While forward strut assemblies 202a, 202b are illustrated as replacing forward wing supports, forward strut assemblies 202a, 202b may replace either or both of forward wing supports or aft wing supports 212a, 212b. Struts 208a, 208b may each have a static or variable length depending on the embodiment. In other embodiments, struts 208a, 208b may be tunable to provide an adjustable and desired stiffness for the wing, as by, for example, utilizing a damper or elastomer or tailoring the strut geometry.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An airframe for a tiltrotor aircraft comprising:
a wing airframe including a rib;
a fuselage airframe including a fore-aft overhead beam; and
a cradle support assembly including a strut coupled to the fore-aft overhead beam and the wing airframe;
wherein, the rib, the fore-aft overhead beam and the strut are substantially aligned to form a wing-fuselage integrated airframe beam assembly to support the wing airframe.

2. The airframe as recited in claim 1 wherein the strut further comprises a forward strut coupled to the fore-aft overhead beam and a forward side of the wing airframe; and
wherein the cradle support assembly further comprises an aft wing support coupled to the fore-aft overhead beam and an aft side of the wing airframe.

3. The airframe as recited in claim 1 wherein the strut further comprises an aft strut coupled to the fore-aft overhead beam and an aft side of the wing airframe.

4. The airframe as recited in claim 1 wherein the strut further comprises a forward strut and an aft strut, the forward strut coupled to the fore-aft overhead beam and a forward side of the wing airframe, the aft strut coupled to the fore-aft overhead beam and an aft side of the wing airframe.

5. The airframe as recited in claim 1 wherein the cradle support assembly further comprises a strut post coupled to the wing airframe, the strut coupled to the wing airframe via the strut post.

6. The airframe as recited in claim 5 wherein a first end of the strut is coupled to a top end of the strut post and a second end of the strut is coupled to the fore-aft overhead beam.

7. The airframe as recited in claim 1 wherein the strut further comprises a static length strut.

8. The airframe as recited in claim 1 wherein the strut further comprises a variable length strut.

9. The airframe as recited in claim 1 wherein the strut further comprises a damper.

10. The airframe as recited in claim 1 wherein the strut is tunable to adjust a stiffness of the wing airframe.

11. The airframe as recited in claim 1 wherein the wing airframe further comprises a forward spar, an aft spar, a top skin, a bottom skin and a plurality of ribs to form a torque box structure.

12. The airframe as recited in claim 1 wherein the strut forms a top side of the cradle support assembly and the wing airframe further comprises a top skin, the strut and the top skin forming an aerodynamic profile.

13. The airframe as recited in claim 1 wherein the fuselage airframe further comprises a side wall and wherein the wing-fuselage integrated airframe beam assembly forms a generally vertical plane with the side wall of the fuselage airframe.

14. The airframe as recited in claim 1 wherein the fuselage airframe has outboard edges; and
wherein the wing airframe further comprises a plurality of ribs spaced spanwise along the wing airframe, the rib of the wing-fuselage integrated airframe beam assembly proximate one of the outboard edges of the fuselage airframe.

15. The airframe as recited in claim 1 wherein the cradle support assembly further comprises wing contour ridges protruding vertically from the fore-aft overhead beam, the wing contour ridges integral with the fore-aft overhead beam.

16. The airframe as recited in claim 1 wherein the cradle support assembly further comprises one or more shear ties coupling an underside of the wing airframe to the fore-aft overhead beam.

17. A tiltrotor aircraft comprising:
a fuselage supported by a fuselage airframe, the fuselage airframe including first and second fore-aft overhead beams;
a wing coupled to the fuselage and supported by a wing airframe, the wing airframe including first and second ribs;

a first cradle support assembly including a first strut coupled to the first fore-aft overhead beam and the wing airframe; and a second cradle support assembly including a second strut coupled to the second fore-aft overhead beam and the wing airframe;

wherein, the first rib, the first fore-aft overhead beam and the first strut are substantially aligned to form a first wing-fuselage integrated airframe beam assembly and the second rib, the second fore-aft overhead beam and the second strut are substantially aligned to form a second wing-fuselage integrated airframe beam assembly, the wing-fuselage integrated airframe beam assemblies supporting the wing.

18. The tiltrotor aircraft as recited in claim 17 wherein the wing further comprises first and second outboard ends respectively having first and second propulsion assemblies coupled thereto and subject to aeroelastic movement in forward flight, and wherein the wing is subject to deflection in response to aeroelastic movement of the first and second propulsion assemblies, the wing-fuselage integrated airframe beam assemblies reducing deflection of the wing.

19. The tiltrotor aircraft as recited in claim 17 wherein the wing-fuselage integrated airframe beam assemblies increase pitch stiffness of the wing.

20. The tiltrotor aircraft as recited in claim 17 wherein the wing-fuselage integrated airframe beam assemblies are substantially parallel to one another.

* * * * *